United States Patent
Gould et al.

(10) Patent No.: US 11,624,271 B1
(45) Date of Patent: Apr. 11, 2023

(54) METHOD FOR ENHANCING OIL RECOVERY FROM GROUPS OF WELLS

(71) Applicants: Thomas Gould, Golden, CO (US); David J. Szabo, Anchorage, AK (US)

(72) Inventors: Thomas Gould, Golden, CO (US); David J. Szabo, Anchorage, AK (US)

(*) Notice: Subject to any disclaimer, the term of this patent is extended or adjusted under 35 U.S.C. 154(b) by 12 days.

(21) Appl. No.: 17/719,442

(22) Filed: Apr. 13, 2022

Related U.S. Application Data

(63) Continuation of application No. 17/555,381, filed on Dec. 18, 2021, which is a continuation of application No. 17/087,814, filed on Nov. 3, 2020, now Pat. No. 11,280,170.

(60) Provisional application No. 62/930,402, filed on Nov. 4, 2019.

(51) Int. Cl.
  *E21B 43/16* (2006.01)
  *C09K 8/58* (2006.01)
  *B63B 43/00* (2006.01)
  *E21B 37/06* (2006.01)

(52) U.S. Cl.
  CPC ............ *E21B 43/162* (2013.01); *B63B 43/00* (2013.01); *C09K 8/58* (2013.01); *E21B 37/06* (2013.01)

(58) Field of Classification Search
  CPC ......... C09K 8/58; E21B 37/06; E21B 43/162; E21B 43/00
  See application file for complete search history.

(56) References Cited

U.S. PATENT DOCUMENTS

| | | | |
|---|---|---|---|
| 3,933,205 A | 1/1976 | Kiel | |
| 5,073,666 A * | 12/1991 | Zemanian | C07C 2/76 585/734 |
| 6,769,486 B2 | 8/2004 | Lim | |
| 6,883,607 B2 | 4/2005 | Nenniger | |
| 7,527,096 B2 * | 5/2009 | Chung | E21B 43/305 166/263 |
| 8,727,000 B2 | 5/2014 | O'Dowd | |
| 9,476,817 B2 | 10/2016 | Guillot | |
| 10,724,351 B2 | 7/2020 | Babcock | |
| 10,570,715 B2 | 11/2020 | Babcock et al. | |
| 2013/0228330 A1 | 9/2013 | Loree | |
| 2014/0014375 A1 | 1/2014 | Boerrigter | |
| 2015/0006124 A1 | 1/2015 | Zhang | |

(Continued)

OTHER PUBLICATIONS

Wan, T., Sheng, J. J., and Soliman, M. Y. 2013. Evaluation of the EOR Potential in Fractured Shale Oil Reservoirs by Cyclic Gas Injection, paper SPE-168880 or URTeC-1611383.

(Continued)

*Primary Examiner* — Silvana C Runyan
(74) *Attorney, Agent, or Firm* — Clifford H. Kraft

(57) ABSTRACT

A liquid phase huff and puff method of enhanced oil recovery (EOR) applied to multiple groups of existing horizontal or vertical wells in a shale or tight rock reservoir resulting in additional oil recovery. The method utilizes a pumping phase for a chosen pumped well group, and a production phases for the remaining well groups. The production phases typically last longer than the pumping phases. The method operates such that while one of the well groups is pumping, the remaining well groups are producing, A new pumped well group is chosen from the production well groups upon completion of each pumping phase, with the previous pumped well group being converted to a producing well group.

6 Claims, 5 Drawing Sheets

(56) References Cited

U.S. PATENT DOCUMENTS

| | | | |
|---|---|---|---|
| 2015/0060075 A1* | 3/2015 | Blom | C09K 8/594 166/307 |
| 2017/0159416 A1 | 6/2017 | Sheng | |
| 2017/0218743 A1 | 8/2017 | Babcock | |
| 2017/0283688 A1 | 10/2017 | Valencia et al. | |
| 2018/0057732 A1 | 3/2018 | Babcock et al. | |
| 2018/0058182 A1 | 3/2018 | Babcock | |
| 2018/0298731 A1 | 10/2018 | Bishop | |
| 2018/0347328 A1 | 12/2018 | Aguilera et al. | |
| 2019/0055825 A1 | 2/2019 | Babcock | |
| 2021/0115775 A1 | 4/2021 | Hotton et al. | |

OTHER PUBLICATIONS

Stephen Rassenfoss, JPT, Oct. 2017 Shale EOR Works, But Will It Make a Difference?

Todd Hoffman and David Reichhardt; URTeC: 147, Jul. 2019. Quantitative Evaluation of Recovery Mechanisms for Huff-n-puff Gas Injection in Unconventional Reservoirs.

Trent Jacobs; JPT, Mar. 2019. Shale EOR delivers, so why won't the sector go big?

Doyle G. Marrs, JPT, Apr. 1961 Field Results of Miscible-Displacement Program Using Liquid Propane Driven by Gas, Parks Field Unit, Midland County, Texas.

Roger E. Sessions, JPT, Jan. 1962 Small Propane Slug Proving Success in Slaughter Field Lease.

Kwanghee Chun, Stanford Geothermal Workshop Proceedings, 2013 Fracture Propagation Under Poro-Thermally Induced Stress Using The Displacement Discontinuity Method.

Qibin Lin, et al, Advances in Civil Engineering, Article 4068918, Mar. 2018 An Experimental Study on Cracking Behavior of Precracked Sandstone Specimens under Seepage Pressure.

* cited by examiner

METHOD FOR ENHANCING OIL RECOVERY FROM GROUPS OF WELLS

This is a continuation of U.S. patent application Ser. No. 17/555,381 filed Dec. 12, 2021 which was a continuation of U.S. patent application Ser. No. 17/087,814 filed Nov. 3, 2020, now U.S. Pat. No. 11,280,170 issued Mar. 3, 2022 which claimed priority to U.S. Provisional Patent Application No. 62/930,402 filed Nov. 4, 2019. U.S. Pat. No. 11,280,170 and U.S. application No. 62/930,402 are hereby incorporated by reference in their entireties.

BACKGROUND

Field of the Invention

The present invention relates generally to Enhanced Oil Recovery (EOR) and more particularly to a method and system for increasing recovery yield over prior EOR methods.

Description of the Problem Solved

Due to the vast amount of oil and gas trapped in shale reservoirs and extra tight rock reservoirs in the United States and elsewhere, there has been considerable effort in recent years to extract these hydrocarbon fluids. Shale is a mineral form that is particularly easy to fracture along various planes. Shale reservoirs contain "rich" field gas that contains propane (C3) and butane (C4) as well as oil that contains C3 and C4. A typical gas and oil (hydrocarbon) extraction technique for shale is to use methods that fracture the rock at points along a horizontal well. The hydrocarbon fluids can be extracted from these fracture points and recovered using natural pressure. The technique is colloquially known as "fracking". Extra tight rock reservoirs, including sandstones or carbonates, behave similarly to shale reservoirs. After several years, the production from these wells declines as pressure decreases. Ultimately the wells reach their economic limit where operating expenses exceed revenues, at which point the wells must be refraced, redrilled, or abandoned. Methods to combat this natural decline in production and increase recovery of the remaining hydrocarbon fluids are known as Enhanced Oil Recovery (EOR).

There are three major prior art methods of EOR: thermal injection, solvent injection and chemical injection. Thermal injection uses hot water and/or steam to heat the reservoir and cause highly viscous oil to become less viscous, flow to the well bore and be pumped to the surface. Solvent injection is a process by which various gases such as carbon dioxide, nitrogen, or methane rich gas are injected into the reservoir. These gases are used to reduce oil viscosity, promote miscibility, and increase reservoir pressure that in turn pushes some of the remaining oil and gas to the producing wells where it is pumped to the surface. Chemical injection involves surfactants, nano-particles, and/or microbes that employ a variety of mechanisms that release some of the remaining oil and gas. Chemical injection is often used in conjunction with either of the other techniques.

Almost all EOR methods in shale and extra tight rock are cyclic (called "Huff-and-Puff"), involving alternating phases of injection followed by production from the same wells. During an injection phase (Huff), the substance being injected is forced into the well until the pressure reaches a desired maximum in the reservoir which may be between 2000-9000 psi. The injection phase is followed by the production phase (Puff), where the hydrocarbon fluids are produced back up the well as the pressure drops. When the pressure reaches a specified minimum, another Huff and Puff cycle starts. Each Huff phase and Puff phase is variable and can range from days, to weeks, to months, depending on a number of variables determined by the reservoir, oil and other characteristics.

Sheng in U.S. Published Patent Application 2017/0159416 teaches optimization techniques for Huff-and-Puff using a gas such as methane (C1), natural gas, carbon dioxide, nitrogen, or combinations thereof. Sheng attempts to optimize the cycle times and pressures.

Valencia et al. in U.S. Published Patent Application 2017/0283688 teach an EOR process that uses an enriched hydrocarbon fluid derived in-situ for injection. Valencia uses C2+ (which is primarily ethane) or C3 (propane) at reduced temperatures. Enrichment generally is accomplished by removing C1 (methane), and cooling the injection fluid to −30 degrees F. Valencia also teaches fluid reinjection.

Babcock et al. in U.S. Published Patent Application 2018/0057732 teach a method of EOR from a resource reservoir that injects fluids via an injection well and extracts via a nearby production well. The injection fluid may consist of a mixture of C2 (ethane), C3(propane), C4(butane) and C5+ (pentane and longer hydrocarbons). The mixture is cooled below 0 degrees F. Babcock also teaches using C1 (methane), nitrogen and carbon dioxide. Babcock in U.S. Published Patent Application 2018/0058182 teaches using Y-Grade Natural Gas Liquids (NGL) in the same manner described above in this paragraph.

Enhanced Oil Recovery (EOR) as relates to the present invention takes place in both horizontal and vertical wells in shale and extra tight rock formations that have declined in output. Prior art methods include Huff and Puff where gas or chemicals are injected into the wells on a cyclic basis. The previous methods have several key disadvantages: (1) injecting a gaseous mixture into shale reservoirs requires very high pressures in order to achieve miscibility in the reservoir. Two fluids, such as gas and oil, are "miscible" when they form a single phase after being mixed in any proportion when first brought into contact at a given pressure and temperature. The compressors and related equipment have to be specially designed and fabricated which takes a long lead time, and is very expensive; (2) very large quantities of gas are required for Huff and Puff, necessitating additional pipelines capable of handling high pressures running from gas sources to the compressors and then to the various producing wells. This requirement also adds to the capital expenditures (CAPEX). The increased CAPEX and need to find sufficient availability of the right kind of gas automatically eliminate many oil and gas fields and existing wells from utilizing the previous Huff and Puff methods. Therefore, a Huff-and-Puff method that uses only liquids instead of gases alone or gases combined with liquids would have significant advantages in certain reservoirs and fields by lowering the CAPEX due to (a) substituting existing, easy to modify pumps to push hydrocarbon fluids into the formation to stimulate the oil thereby eliminating the need for costly compressors; (b) being able to transport the hydrocarbon liquids by truck instead of pipeline, eliminating the need to source gas and lay expensive pipelines and taps; and (c) using modular surface equipment that is transportable and has a much smaller "footprint" to accomplish (1) and (2) described above which further reduces the CAPEX.

SUMMARY OF THE INVENTION

The present invention relates to Enhanced Oil Recovery (EOR) from aging horizontal and vertical wells in shale and extra tight rock formations. A mixture of C3 (propane) and C4 (butane) is cyclically pumped as a stimulation treatment into the well in liquid phase to "fill" the well up to a pressure of approximately 3000 psi (although other pressures are within the scope of the present invention). The fill portion of the cycle lasts approximately ten to sixty days (although other time periods are within the scope of the present invention). The well is then allowed to produce for approximately 30 to 120 days (although other time periods are within the scope of the present invention). Because the entire hydrocarbon fluid is in liquid phase, and since the pressure necessary to pump the fluids into the formation is relatively low, the stimulation treatment can be accomplished with a pump rather than a high pressure gas compressor. A "slug" of C3-C4 in liquid phase is loaded from tanker trucks to a holding tank at around 100 psi. The pump delivers the liquid into the well at a pressure of around 3000 psi. The ratio of C3/C4 can be adjusted to optimize recovery from given wells in given basins. The ratio can run from 0 (100% C4) to 1 (100% C3), with any intermediate ratio available. The injection usually starts with a ratio of 0.5 (50-50) but may be adjusted as fluid cost and reservoir characteristics demand. As the production phase of the Huff and Puff proceeds, three fluids return from the wellhead: liquid oil, water, and vapor streams. The method of the present invention recovers almost all of the stimulation treatment C3-C4 mixture from the vapor stream and from the oil stream. Water is removed in standard ways known in the art. The remaining oil and gas are shipped or piped to refineries or other market destinations. The recovered C3-C4 is recycled as a liquid stream and used for the next stimulation treatment Huff phase. The system thus becomes self-sustaining since any of the C3-C4 that is left in the reservoir as part of the process is made up by the additional C3 and C4 that is inherent in the newly recovered oil and gas from the reservoir. Because the equipment required to pump liquid C3-C4, and separate the produced component liquid and vapor streams and recover it is relatively compact and light, the entire surface apparatus can be mounted on a skid that can be transported from location to location as needed. The economic model is driven by the exclusive use of liquid components that are pumped through the wells into the formation instead of first being compressed and then injected. The result is to increase the potential number of wells and reservoirs that can benefit from the present invention by (a) eliminating custom manufactured high pressure compressor systems; (b) eliminating the resulting permanent facility costs including above or below ground storage capacity for the blended gas and treatment fluids necessary for the compressors to use, (c) reducing CAPEX by re-deploying the same skid mounted equipment since it is now transportable instead of relatively permanent; (d) eliminating expensive pipelines to bring the necessary volumes of gas to the injection facility; and (e) reducing CAPEX by eliminating the need to add future gas to mix with the treatment fluids.

In addition to just C3 and C4, other liquid phase products may be added to the stimulation treatment mixture including C5+ (natural gasoline which includes pentane C5 and longer hydrocarbons) and C2 (ethane). Again, the ratios can be adjusted to optimize production.

C5+ refers to higher molecular weight hydrocarbons which are liquid at standard conditions of pressure and temperature including pentane (C5), hexane (C6), heptane (C7), octane (C8), and nonane (C9). The term C5+ can refer to any of these pure hydrocarbons (including isomers) in that molecular weight range, or any mixture of such hydrocarbons in any combination.

In an alternate embodiment, pure C4 is pumped into the well. During the production phase, this C4 exits at the wellhead mostly dissolved in the oil. Under certain market conditions, this enriched oil will bring a higher price than other varieties of crude oil. In this embodiment, the enriched oil is sold as-is after normal stabilization.

DESCRIPTION OF THE FIGURES

Attention is now directed to several inline figures.

Several figures have been presented to illustrate features of the present invention. The scope of the present invention is not limited to what is shown in the figures.

DESCRIPTION OF THE PREFERRED EMBODIMENTS

The present invention pumps a liquid C3-C4 mixture into a well at a relatively low pressure, with approximately 3000 psi being preferred, as a stimulation treatment. While this is the preferred pressure, different pressures may be used with different formations at different reservoir depths. By C3 we mean propane, and by C4 we mean butane (including any ratio of straight chain butane to iso-butane). A pre-mix of liquid C3-C4 is loaded from transport vehicles such as a tanker truck into a holding tank on site. A pump is used to pump the mixture into the well at the desired pressure which is typically around 3000 psi. A major advantage of the present invention for Huff and Puff EOR is the use of liquids that only requires a pump to place them into the formation, instead of a high pressure compressor system which is required to inject a vapor stream into wells. The stimulation treatment Huff phase of a given well lasts approximately 10 to 60 days and the production of Puff phase lasts approximately 30 to 120 days. The total Huff and Puff cycle period lasts approximately 40 to 180 days. The Huff and Puff cycle is then repeated. During the production phase, C3-C4 is recovered from the liquid oil stream and the hydrocarbon vapor stream leaving the well head. A major advantage of the present invention is that most of the liquid C3-C4 pumped into the formation in the Huff phase can be recovered during the Puff phase from the hydrocarbon vapor and liquid streams and then pumped back into the formation in the next Huff phase stimulation treatment. Thus, while a low cost of C3-C4 is an important criteria when initiating the first Huff and Puff cycles, the high recovery rate for recycle allows this new Huff and Puff method to potentially be economic in locations where the cost of the treatment liquids may be higher.

As experience with a given well is gained, the ratio of C3/C4 can be adjusted to optimize production based on a variety of factors including the individual liquid component costs. Typically, the ratio starts out at 0.5 with trial adjustments being made during subsequent pumping periods. The entire process may run until production finally drops below economically viable levels. In some embodiments of the invention, the ratio may be re-adjusted after the passage of time.

The equipment needed to perform the above-described operation is light and can be made transportable by assembling it on a skid. Since the skid can be economically transported from site to site, the CAPEX associated with building the infrastructure for a fixed facility is eliminated. Moreover, when the hydrocarbons in a well, or groups of wells, can no longer be economically recovered, or when desired, the equipment can be simply transported to another location.

Figure 1:
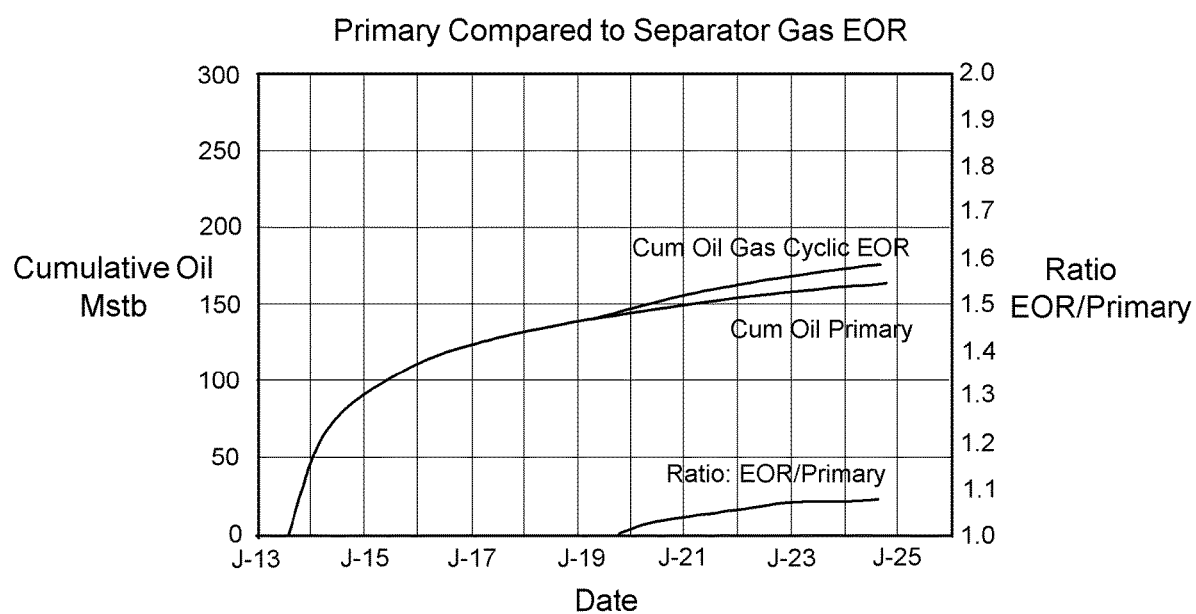
FIG. 1 shows a simulation of EOR using prior art techniques.

Turning to FIG. 1, typically produced separator gas (primarily C1) EOR for prior art gas injected wells is shown in a simulation at a basin in the western U.S. The ascending line shows the prior art enhanced recovery using high pressure gas compressors. As can be seen, separator gas EOR produces more oil than the primary; however, the increase in production is very slight.

Figure 2:
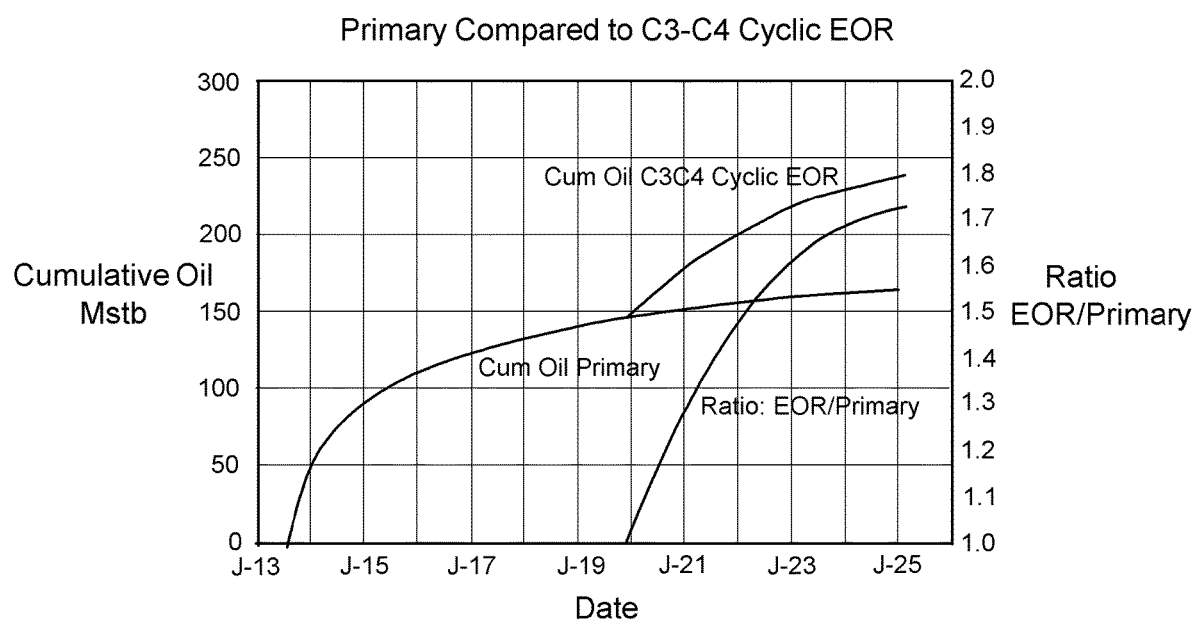
FIG. 2 shows a simulation of EOR using the principles of the present invention.

FIG. 2 shows a simulation of the present invention performing the stimulation treatment on the same well. As can be seen, the cumulative oil produced by liquid C3-C4 EOR is significantly greater than Huff-and-Puff EOR using methane gas.

Figure 3:
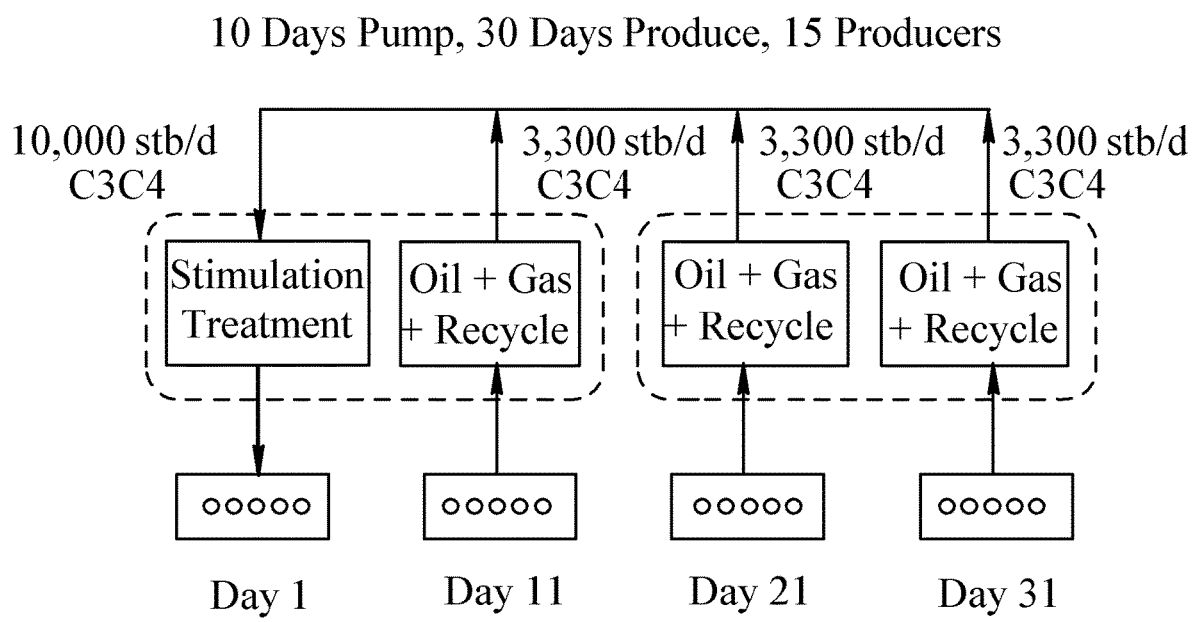
FIG. 3 shows a block diagram of an embodiment of the present invention being used with a group of twenty wells.

FIG. 3 shows a block diagram of the present invention being used with a group of twenty wells with equipment on two separate skids at a site. To clarify, in the figures throughout this patent application, the use of "skid" can mean several "skids" working together. The five wells on the left depict the stimulation treatment Huff phase from day 1 to day 10. The remaining wells are all in the production or Puff phase, each producing for 30 days. The stimulation treatment rotates at 10 day intervals. Approximately 10,000 stb/d (stock tank barrel per day) of C3-C4 mixture are pumped as a stimulation treatment into the five wells over the 10 day period. The projected total C3-C4 recovery over the 30 day period is 9,900 stb/d reflecting a 99% recovery factor. While this may be optimistic, greater than 90% recovery is entirely possible. The C3-C4 is then recycled in a liquid phase for a subsequent stimulation Huff phase.

It should be noted that the plan shown in FIG. 3 is merely representative of a possible application of the present invention. Any combination of the number of wells and the arrangement of skids is within the scope of the invention. The number of wells being serviced in a cycle can be adjusted according to the accessibility of the wells and the particular layout of a given field. Any number of skids may be used simultaneously, with two skids shown in FIG. 3 as an example.

The skid, if properly constructed, can have a lifetime of at least fifteen years. Given the projected amount of oil that can be economically recovered from a typical well, a skid will probably be transported to a different location at about five years or whenever the wells' oil and gas production reach their economic limit. The number of years a skid is used may vary from site to site. Thus, in this example, if a skid lasts fifteen years, it is in service at three different locations for five years each. The skid can be recycled and refurbished at the five year interval. Thus, a group of two skids, over their fifteen year lifetime, will service approximately sixty wells using each skid three times.

Figure 4:
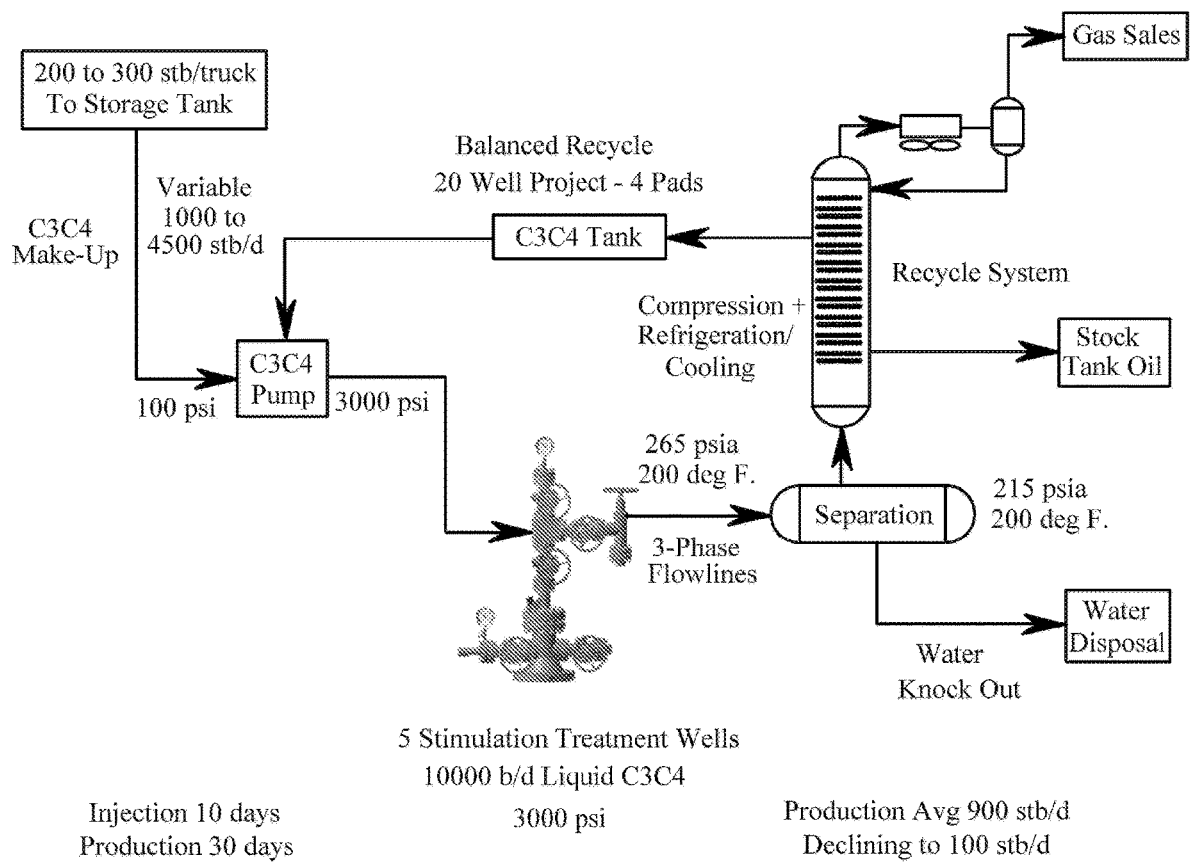
FIG. 4 shows a schematic diagram of an embodiment of the present invention at a well head.

FIG. 4 shows a schematic diagram of an embodiment of the present invention at a well head. A transport vehicle (not shown) delivers a liquid mixture of C3-C4 to a holding tank (not shown). The quantity in the holding tank can run between 1000 and 4500 barrels of the liquid mixture. A typical truck can deliver around 200-300 barrels of liquid C3-C4. The pressure at this point is approximately 100 psi. The mixture enters the C3-C4 pump and is pumped into a well head at approximately 3000 psi with a temperature of between approximately 40 and 80 degrees F. The pump can be attached to all the wells that will be serviced, such as the 10 wells per skid shown in FIG. 3. During the production phase, all fluids from the well head are routed to a separation unit at approximately 215 psi at around 200 degrees F. This three phase mixture consists of water, hydrocarbon vapor, and hydrocarbon liquids. In the separation unit, water is removed from the fluid mixture using methods known in the art. The remaining fluid mixture of vapor and liquid is routed to a compression/cooling system called a "Recycle System" (also called Recycle Treater). Here the vapor is separated into fuel gas, which is mostly C1 with some C2, and C3-C4. The fuel gas is routed off for sale and the C3-C4 from the vapor phase is liquefied and routed to a storage tank (labeled "C3C4 tank" in FIG. 4). The hydrocarbon liquid from the fluid mixture is separated into oil and liquid C3-C4. The oil is routed to a stock tank for piping or shipping as crude oil. The liquid C3-C4 is routed to the "C3C4 tank" in FIG. 4. The liquid C3-C4 is recycled and pumped back into the well head for the next stimulation treatment. The pump can be a high pressure triplex pump with liquid solvent seals or any other suitable pump. Such pumps are manufactured by companies like National Oilwell Varco and others.

Figure 5:
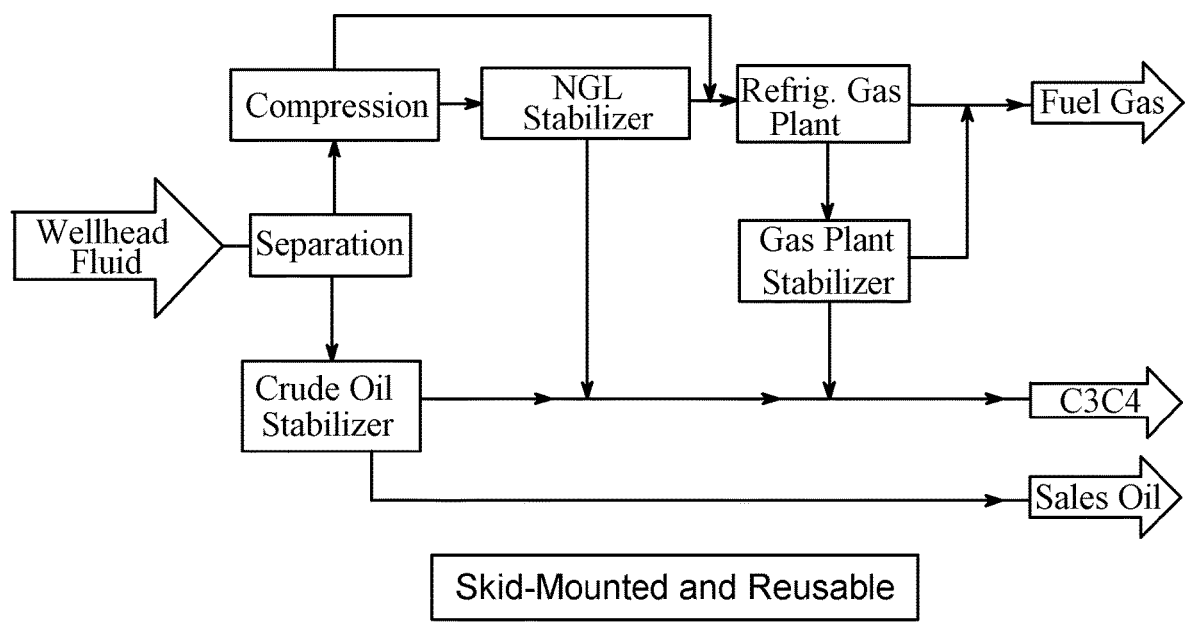
FIG. 5 shows a block diagram of an embodiment of the skid mounted recycling unit.

FIG. 5 shows a block diagram of an embodiment of the skid mounted recycling unit. The well head fluids—water, hydrocarbon vapor, and hydrocarbon liquid—enter the separation unit where water and liquid oil is separated from the vapor. A Natural Gas Liquid (NGL) stabilizer performs the function of reducing the vapor pressure of liquid hydrocarbon condensate to a value ensuring safety during transportation and storage, and performs separation of lighter from heavier products. In the case of the present invention, additional C3 and C4 are removed from the light hydrocarbon vapors by refrigeration or cooling. Any lighter products such as C1 and C2 can be removed from the liquid C3-C4 in a gas plant stabilizer.

The crude oil is also stabilized by removing C3 and C4 from it, and can be "sweetened" if necessary by removing impurities such as hydrogen sulfide.

The liquid C3-C4 is recycled as has been discussed.

In an alternate embodiment of the present invention, pure C4 can be pumped into the well to serve as a stimulation treatment, and the C4 can be allowed to remain dissolved in the final oil product. This allows a more valuable oil product to be directly sold.

Different embodiments of the present invention can include one or more control units associated with the skid equipment. In these embodiments, a rugged field computer or PLC can control and monitor the entire pumping-production process at a skid. In some embodiments, a group of skids in operation can communicate wirelessly with a remote station or with each other reporting back operational parameters such as pressures, temperatures, flow rates and other parameters. The skid can also be controlled remotely from the remote station or from a different skid. Typically, this wireless communication is by radio or satellite since most sites are in remote areas. Radios can operate on ISM frequencies or specially licensed frequencies. If the skid happens to be located where there is cellular telephone service, communication may also be established over a cellular network.

Thermal induced fracturing (TIF) is a well-known result of pumping cool liquids into warm formations. TIF has been studied as an additional stimulation method for prior hydraulic fractures in shale reservoirs and tight rock. Various embodiments of the process of the present invention will pump cool 40 to 80 degrees F. so it forms a liquid state, and then pump those liquids into reservoirs that are typically 175 to 300 degrees F. This causes an increased flow rate and stimulated rock volume (SRV) for both pumped and produced fluids resulting in additional oil recovery above the base EOR method. Increasing SRV is a major benefit to the invention process by providing more oil filled rock to be contacted by solvent.

TIF is known to cause secondary fractures perpendicular to the original hydraulic fractures in the zone near the wellbore where rock stress is increased by cooling. Repeated cycles of pumped cool liquids will extend the secondary fracturing deeper into the reservoir on each cycle causing continuously increasing well productivity and SRV.

In addition, to thermal stress the repeated cycles of pressure in this invention cause rock stress to increase and decrease each cycle. Field observations in shale wells indicate that the zone of improved productivity created by hydraulic fracturing with proppant is in a region approximately 200 feet from the wellbore, but micro seismic observations show induced fracturing occurs approximately out to 1000 feet from the wellbore. In shale formations the proppant stays relatively close to the wellbore and far distant induced fractures do not get filled with proppant. During primary production, the pressure drawdown causes stress to increase which in turn closes the far distant fractures that have no proppant. As part of this invention, liquid C3-C4 is pumped as a stimulation treatment causing rock pressure to increase rapidly with an associated decrease in rock stress which allows the previously far distant fractures to reopen. Repeated stress cycles are known to cause "Spalling" of the rock, which is a process where rock chips are formed. Kiel in U.S. Published Patent Application 1976/3933205 teaches that multiple hydraulic fracturing cycles with increasing and decreasing pressure will induce Spalling. The Spalling will cause the induced fractures to be propped open resulting in improved well productivity.

The present invention includes self-propping of far distant induced fractures as a result of rock Spalling caused by pressure and stress increases and decreases in repeated cycles. The repeated cycles of pressure will cause far distant induced fractures to stay permanently open resulting in increased well productivity and SRV resulting in additional oil recovery.

Hydraulic fracturing of shale wells occurs in stages which are spaced approximately 200 feet apart along a wellbore lateral resulting in about 25 stages for a 5000 foot long lateral. Each stage is pumped separately in sequence and is unique relative to the local rock and fluids that are encountered. Field observations indicate that the stages do not flow back uniformly with some stronger than others. In many cases some of the stages do not flow at all and this is attributed to some form of "Formation damage". Formation damage is a technical category of production engineering that can include many types of phenomenon ranging from mechanical to chemical blockage of flow. This invention pumps liquid C3-C4 into shale wells which is classified as a solvent. As part of this invention, repeated cycles of solvent will remove formation damage from reduced flow or blocked flow fracture stages. The repeated cycles of solvent will cause previously damaged fracture stages to be improved over time resulting in increasing well productivity and increased SRV resulting in additional oil recovery.

The present invention process starts at a reservoir pressure lower than initial, after some period of primary production, perhaps as low as 500 psi. Liquid C3-C4 is pumped as a stimulation treatment into the well in a liquid phase to "fill" the well up to a pressure of approximately 3000 psi (although other pressures are within the scope of the present invention). This "fill" phase is relatively expensive in early cycles. Different embodiments of the present invention can include the addition of water, nitrogen or methane dominated field gas to supplement C3-C4 plus other liquid phase products in the early cycles of the EOR process. Water, nitrogen, or methane dominated field gas is lower cost fluid that can assist in the "fill" portion of early cycles. Continued addition of Water, nitrogen, or methane dominated field gas is not beneficial in later cycles as they begin to interfere with oil production. The optimal application of supplemental Water, nitrogen, or methane dominated field gas to selected early cycles is part of this invention.

A further embodiment of the current invention involves the application of one or more well treatment techniques to improve the SRV in the wells used in the C3-C4 process. These treatment techniques involve both prior art and new inventions, but will prove beneficial when economically justified for each well in a project. These treatment techniques may include diverting agents to focus solvent on underperforming stages, a coiled tubing unit to direct the C3-C4 solvent to specific points along the horizontal well's wellbore, the addition of a small amount of proppant to the C3-C4 solvent used in the first and potentially other cycles to help maintain access to newly added SRV, and the addition of a small amount of surfactant to the C3-C4 solvent to alter the wettability of the reservoir system. Any or all of these techniques can be applied to this invention in order to increase the productivity and SRV of an individual well. Increasing SRV is a major benefit to the invention process by providing more oil filled rock to be contacted by solvent.

A further embodiment of the current invention involves the ability to adjust the operating conditions of the Recycle System to allow for the manufacture of a pumpable solvent stream that has a composition designed to be miscible with the reservoir fluids at current reservoir pressures and temperatures, thereby increasing the efficiency of the improved recovery process and increasing the amount of incremental oil recovery achievable from all stimulation cycles. The pumped solvent composition is initially designed specifically based on "equation of state" modeling to be first contact miscible with the oil in the target hydrocarbon reservoir at the low pressure condition existing at the end of primary production. However, since pressure and temperature change with time, the Recycle System is adjustable to optimize the composition with time.

A further embodiment of the current invention involves the ability to adjust the operating conditions of the Recycle System to allow for the manufacture of a larger volume of the pumpable solvent stream that has a composition that is not miscible with the reservoir fluids at current reservoir pressures and temperatures. However, the larger volume will increase the amount of incremental oil recovery achievable from all stimulation cycles.

In an alternate embodiment, pure C4 is pumped into the well. During the production phase, this C4 exits at the wellhead mostly dissolved in the oil. Under certain market conditions, this C4 enriched oil brings a lower price than other varieties of crude oil. In this embodiment, the recycle system is adjusted to capture most of the entrained C4 for recycle into the next stimulation phase thereby increasing the amount of stimulant available and thereby increasing the amount of incremental oil that can be recovered from the project.

A further embodiment of the current invention involves using the Recycle System to treat produced fluids from other wells in the area of interest even though those wells are not being treated with the cyclic stimulation process. Treating the produced fluids from additional wells increases the volume of pumpable solvent available for the stimulation of wells in the project, thereby reducing the amount of solvent that must be imported for the project and thereby increasing the economic value of the project.

A further embodiment of the current invention involves using the Recycle System to treat all produced fluids on a given well pad/production site in order to provide pumpable solvent for stimulation of the reservoir while also reducing the fugitive gas emissions that are inherent in most oil and gas production operations, thereby reducing greenhouse gas emissions associated with the existing operation.

Finally, the present invention may be used in a Greenfield Development. Greenfield Developments typically refer to developing on previously undeveloped land. This includes newly discovered oil reservoirs. Hence, a further embodiment of the current invention involves the incorporation of the cyclic stimulation process and the Recycle System in the design of any new development project in existing or newly discovered oil reservoirs deemed susceptible to benefits from the cyclic stimulation system, thereby increasing the expected volume of oil to be recovered from the project and reducing the amount of fugitive gas emissions expected to be generated from the project with an overall improvement in the economic outlook for the new development project.

Several descriptions and illustrations have been presented to aid in understanding the present invention. One with skill in the art will realize that numerous changes and variations may be made without departing from the spirit of the invention. Each of these changes and variations is within the scope of the present invention.

RELATED PATENTS AND PUBLICATIONS

The following patents and publications relate to the present invention:
001. Sheng in U.S. Published Patent Application 2017/0159416
002. Valencia et al. in U.S. Published Patent Application 2017/0283688 A1
003. Aguilera et al. in U.S. Published Patent Application 2018/0347328 A1
004. Babcock et al. in U.S. Published Patent Application 2018/0057732 A1
005. Babcock et al. in U.S. Published Patent Application 2020/10570715 B2
006. Kiel in U.S. Published Patent Application 1976/3933205
007. Wan, T., Sheng, J. J., and Soliman, M. Y. 2013. Evaluation of the EOR Potential in Fractured Shale Oil Reservoirs by Cyclic Gas Injection, paper SPE-168880 or URTeC-1611383
008. Stephen Rassenfoss, JPT, October-2017 Shale EOR Works, But Will It Make a Difference?
009. B. Todd Hoffman and David Reichhardt; URTeC: 147, July-2019. Quantitative Evaluation of Recovery Mechanisms for Huff-n-puff Gas Injection in Unconventional Reservoirs
010. Trent Jacobs; JPT, March-2019. Shale EOR delivers, so why won't the sector go big?
011. Doyle G. Marrs, JPT, April-1961 Field Results of Miscible-Displacement Program Using Liquid Propane Driven by Gas, Parks Field Unit, Midland County, Texas
012. Roger E. Sessions, JPT, January-1962 Small Propane Slug Proving Success in Slaughter Field Lease
0013. J. R. Christensen, et al, SPE-071203, 2001 Review of WAG Field Experience
0014 Kwanghee Chun, Stanford Geothermal Workshop Proceedings, 2013 Fracture Propagation Under Poro-Thermally Induced Stress Using The Displacement Discontinuity Method
0015 Qibin Lin, et al, Advances in Civil Engineering, Article 4068918, March-2018 An Experimental Study on Cracking Behavior of Precracked Sandstone Specimens under Seepage Pressure

The invention claimed is:

1. A liquid phase cyclic huff and puff method of enhanced oil recovery (EOR) applied to a plurality of groups of existing horizontal or vertical wells in a shale or rock reservoir resulting in additional oil recovery; the method having pumping phases for a pumped well group and production phases for remaining well groups of the plurality of well groups, the production phases lasting longer than the pumping phases; the method operating such that one of the well groups is pumping, while the remaining well groups are producing, with a new pumping well group being chosen from the remaining well groups upon completion of each pumping phase; the method comprising:
   (a) grouping a plurality of existing horizontal or vertical wells into a plurality of well groups, each well group of the plurality of well groups itself containing a plurality of individual wells;
   (b) choosing a current pumped well group from the plurality of well groups;
   (c) beginning a pumping phase for the current pumped well group and a production phase for pumped wells in the remaining well groups;
   (d) pumping a stimulation treatment fluid mixture of liquid propane (C3) and liquid butane (C4) in a predetermined ratio as a liquid phase solvent into at least one well in the current pumped well group until a predetermined quantity of the stimulation treatment fluid is pumped into the current pumped well group;
   (e) recovering oil, gas and pumped fluids from the remaining well groups, and recycling the pumped fluids for pumping in subsequent pumping cycles;
   (f) when the predetermined quantity of the stimulation treatment fluid has been pumped into the current pumped well group, performing the following: (1) ceasing pumping in the current pumped well group, and (2) choosing a new pumped well group different from current pumped well group, and allowing the current pumped well group to enter a production phase;
   (g) making the new pumped well group the current pumped well group;
   (h) repeating steps d-h;
wherein, the plurality of well groups contains a number of well groups between 2 to 10 well groups, dependent on cycle pumping time periods and cycle production time periods, and wherein increasing production cycle time periods requires increasing the number of well groups in the 2 to 10 well groups.

2. The method of claim 1, wherein pumping pressure is 3000 psi or less.

3. The method of claim 1, wherein wells are grouped in the well groups to allow interaction or interference between wells in the current pumped well group to permit the stimulation treatment fluid mixture of liquid propane (C3) and liquid butane (C4) to flow to all wells within the current pumped well group through stimulated rock volume (SRV) between wells bypassing stages blocked by formation damage.

4. The method of claim 1, wherein wells are grouped in the well groups to permit he stimulation treatment fluid mixture of liquid propane (C3) and liquid butane (C4) to be contained within the current pumped well group at a greater pressure than in the remaining well groups.

5. The method of claim 1, wherein a well group in the plurality of well groups contains from 1 to 20 wells, depending on well type, completion type, formation damage, interference with other wells, or injectivity.

6. The method of claim 1 further comprising: causing production phases to have a longer duration than pumping phases.

\* \* \* \* \*